May 14, 1929.   C. M. EASON ET AL   1,713,272

SPEEDOMETER DRIVE REDUCER

Filed June 5, 1926

Inventor
Clarence M. Eason
& George R. Oliver
By Blackmore, Spencer & Hill
Attorneys Patented May 14, 1929.

1,713,272

UNITED STATES PATENT OFFICE.

CLARENCE M. EASON AND GEORGE R. OLIVER, OF PONTIAC, MICHIGAN, ASSIGNORS TO GENERAL MOTORS CORPORATION, OF DETROIT, MICHIGAN, A CORPORATION OF DELAWARE.

SPEEDOMETER-DRIVE REDUCER.

Application filed June 5, 1926. Serial No. 113,912.

This invention relates to gearing and is designed more particularly for use in connection with the transmission of power from a vehicle transmission to a speedometer. Although designed for this purpose it will be understood that its field of usefulness is not so limited. In many vehicles, especially in the case of trucks, variations in the size of tires and rear end ratios make it necessary to provide variable speed ratios for driving the speedometer. By the structure which is made the subject of this invention a unitary device has been provided to take care of this necessity.

It is an object of the invention to provide a unitary adaptor capable of attachment to a power line between a driving and a driven member and containing gearing having the possibility of widely varying driving ratios.

A further object is to secure this variation of gear ratios by making the structure of two identical parts capable of being secured together in different positions of adjustment to correspond with the varying gear ratios.

Another object of the invention is the provision of structures whereby the driving and driven gears are interchangeable, thus providing a step-up as well as a step-down transmission unit and consequently doubling the number of available gear ratios.

A full understanding of the invention may be had from a study of the following specification and examination of the accompanying drawing.

Referring to the drawing.

Figure 1:
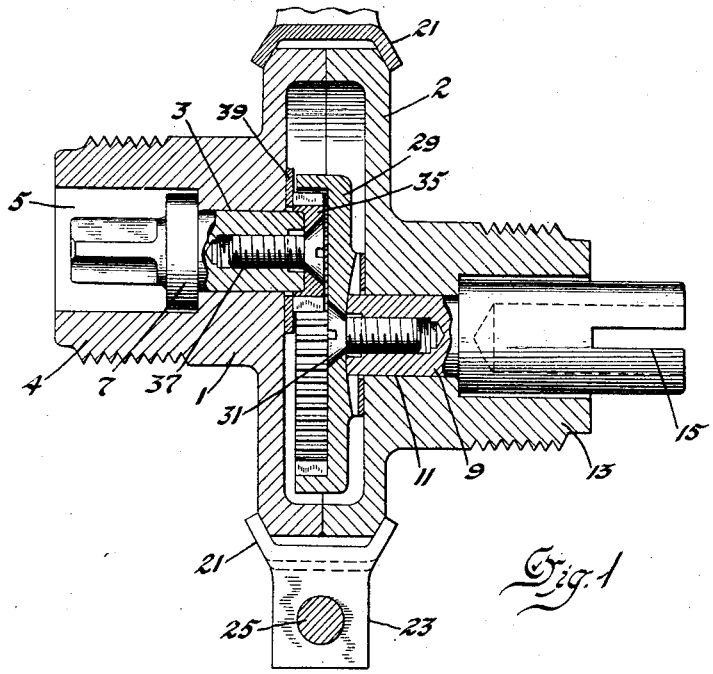
Figure 1 represents the unitary adaptor in section.
Figure 2:
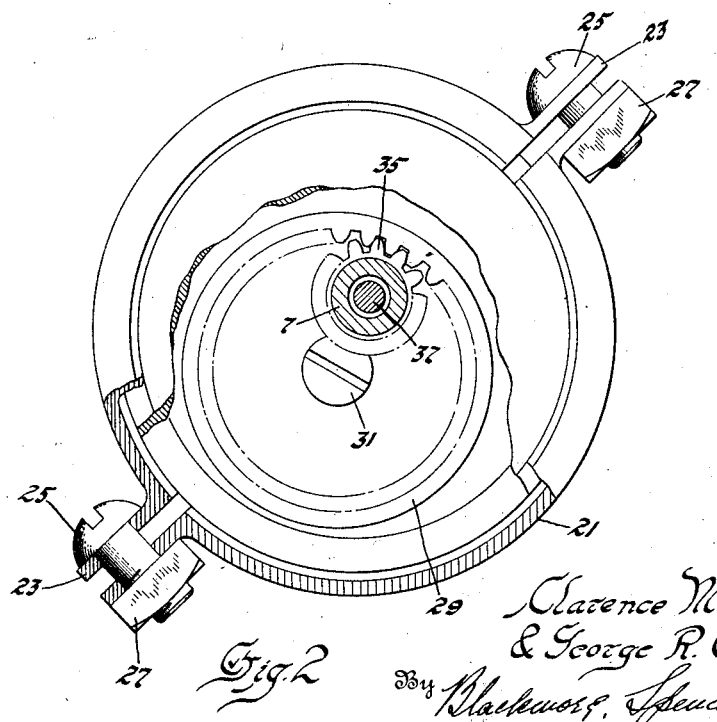
Figure 2 is a side elevation of the same, parts being broken away.

Referring by reference characters to the drawing, numeral 1 represents one of two identical parts constituting a gear housing unit. Reference character 2 is applied to the second half housing member. Part 1 is, as will be seen from Figure 1, in the form of a shallow cup having an eccentric opening 3 extending through the bottom thereof and through a threaded sleeve member 4 projecting therefrom. The outer end of said open end 3 is enlarged as at 5. Extending through said opening 3 is a shaft 7 having a non-circular end adapted to engage an end of a shaft with which shaft 7 is to be coupled in driving relation. It will be understood that the specific shape of the non-circular end is no part of this invention, the part shown being merely illustrative of any provision for a suitable driving connection. The threaded end on part 1 is for a connection with a housing for the shaft, which is to be connected with shaft 7. The arrangement shown was intended for engagement with the flexible housing of the speedometer drive shaft.

Part 2 of the housing carries a shaft 9 which extends through the eccentric opening 11 and through a sleeve 13 which is shown as threaded for connection with a transmission housing.

Shaft 9 has at its end within the sleeve 13 an opening 15 by which it is to be connected with an external shaft.

For securing the two halves of the casing together there is a pair of channel shaped circumferential clamping members 21. These clamping members engage the walls of the casing as best shown in Figure 1. The clamp has mating flanges 23 which are secured together by bolts 25, and nuts 27. By this means it will be seen that the casing members may be secured together in circumferentially adjusted positions.

Within the housing constituted by members 1 and 2 there are carried engaging gear members. On shaft 9 there is mounted an internal ring gear 29. This gear may be secured in any convenient way as by a screw 31, threaded into the end of shaft 9. On shaft 7 is a pinion 35 similarly secured by a screw 37. Washers 39 may be employed by the gears and the inner walls of the cup.

It will be seen that if a driving engagement exists between gear 29 and pinion 35 when the members 1 and 2 are in the position shown, the rotation of 1 and 2 will destroy the driving connection between the gear members and will require a pinion of a different size. This is obviously the result of the eccentric position of shaft 7. It is the intention that there shall be provided, with the two casing members and their shafts and the internal gear, a plurality of pinions, each of which may be associated with the internal gear to give a drive at a definite ratio. To make use of each of these pinions it is only necessary to loosen the securing nuts 27 and relatively rotate the casing members 1 and 2 to a suitable adjusted position.

It will also be evident that if the elements of any one of the gear sets be inter-changed, the driving ratio will be inverted. It is thus possible to secure a step-up as well as a step-down ratio for each pair of gears. This, of course, doubles the possible number of gear ratios which are obtainable with the device as a whole.

By the structure described there is provided what may be called an adaptor unit for placement into a power transmission line and which unit, when associated with a plurality of pinions, constitutes a compact and convenient means for changing the driving ratio between a driving and a driven member, and also of inverting any given ratio.

We claim:

1. A separable transmission unit comprising concentric members relatively adjustable about their common center circumferentially to constitute a gear housing, each member provided with an eccentric external shaft carrying sleeve having attaching means, parallel shafts, one in each of said sleeves, and gearing for driving said shafts one from the other within said housing.

2. A separable power transmission unit comprising concentric members relatively adjustable about their common center circumferentially and constituting a gear housing, each member having an external eccentric shaft carrying sleeve, parallel shafts, one in each of said sleeves, securing means on said sleeves for attachment of the unit, and gearing on the said shafts within the housing.

3. A power transmission unit comprising two members constituting a housing, means to secure said housing members together in circumferentially adjusted position, an externally extended sleeve positioned eccentrically on each member, a shaft mounted in each sleeve, attaching means on said sleeves, relative circumferential adjustment of said members permitting changes in the gearing between said shafts, the gearing elements being interchangeable to double the number of gear ratios.

4. A transmission unit comprising two identical cup shaped members, a shaft extending eccentrically through each cup shaped member, means within the unit for gearing the shafts together, means to secure the cup shaped members in relatively adjustable concentric positions to accommodate different gearing elements and secure varying gear ratios between the shafts.

5. An adaptor unit comprising a housing and cover, each provided with external means for attachment, a shaft extending eccentrically through the housing, a shaft extending eccentrically through the cover, gearing between the shafts, means for clamping the housing and cover together in adjusted positions to accommodate changed gearing elements on said shafts, said last named means consisting of a two part clamp engaging the edges of said housing and cover.

6. An adaptor unit having cooperating casing members with eccentric attaching sleeves, shafts in said casing members extending through the sleeves, cooperating gears on said shafts within said unit, the casing members being concentrically adjustable to accommodate varying gear elements on the shafts, the elements of each gear shaft being interchangeable.

7. A unitary adaptor comprising a driving gear shaft and a driven gear shaft, an internal toothed gear on one shaft and an externally toothed gear on the other shaft, a half casing member in which each shaft is eccentrically mounted, the half casing members being adapted for relative rotation about a common center to a plurality of positions whereby substitution of gearing elements with consequent changed gear ratios is made possible.

8. A unitary transmission adaptor comprising two half casing members relatively adjustable circumferentially, an eccentric shaft through each member, gearing between said shafts within the adaptor including interchangeable gearing elements, the relative circumferential adjustment permitting a substitution of gear elements to provide varying gear ratios.

9. A separable adaptor transmission unit comprising cooperating members having a common center and forming a closed chamber, each of said members having an eccentric journal, shafts mounted in said journals, meshing gears mounted on said shafts within said chamber, said members being adjustable about their common center whereby substitution of gears and changed gear ratios may be effected.

In testimony whereof we affix our signatures.

CLARENCE M. EASON.
GEORGE R. OLIVER.